Figure 4:
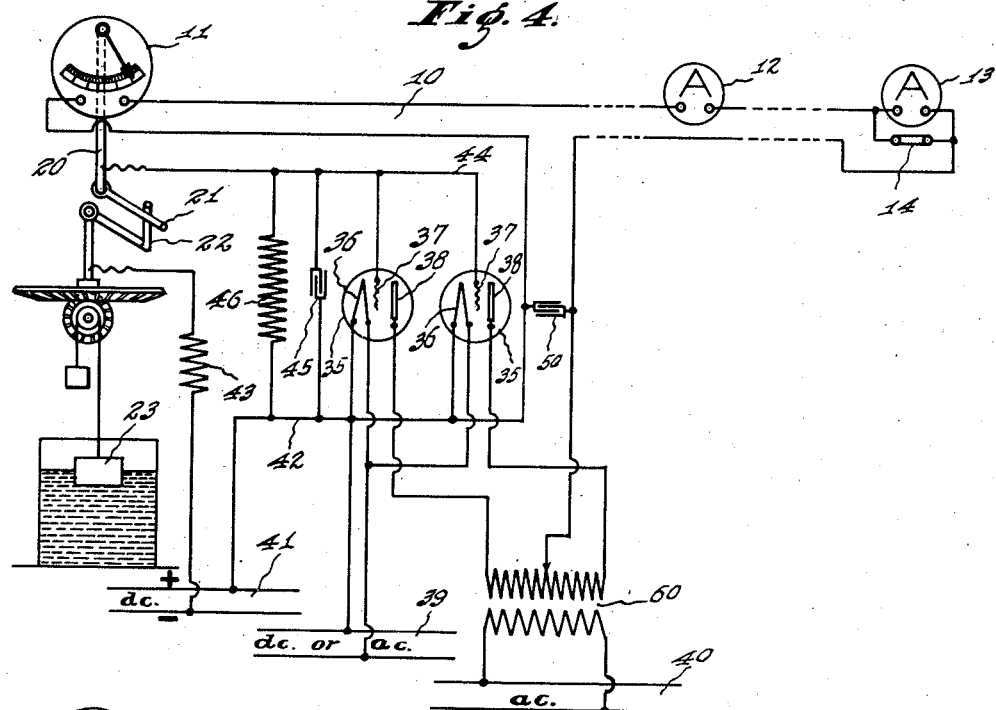

Feb. 20, 1934.  D. J. ANGUS  1,948,092
METHOD AND APPARATUS FOR PRODUCING GOVERNED MOTION AT A DISTANCE
Filed July 15, 1931  2 Sheets-Sheet 1
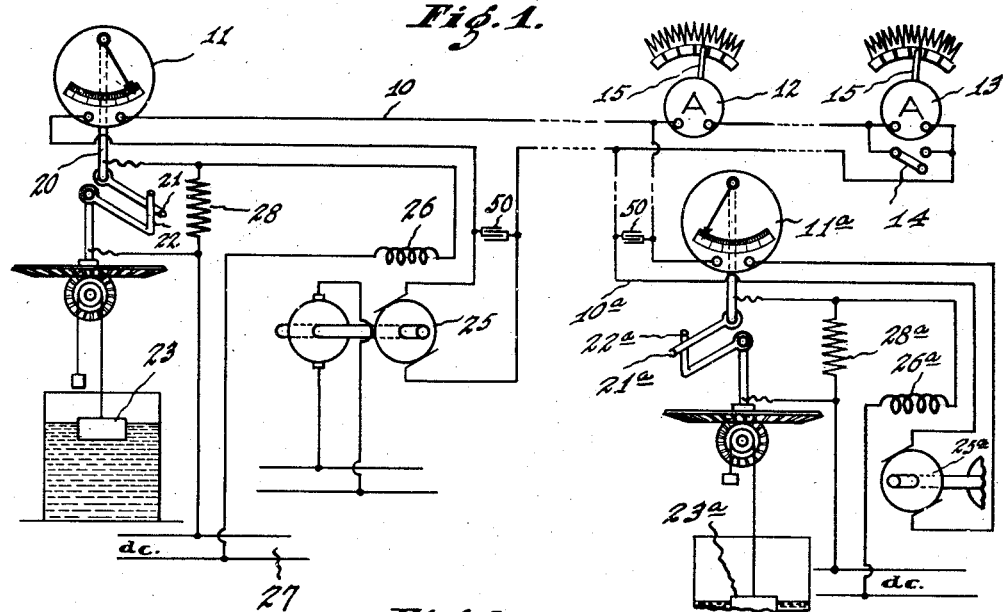
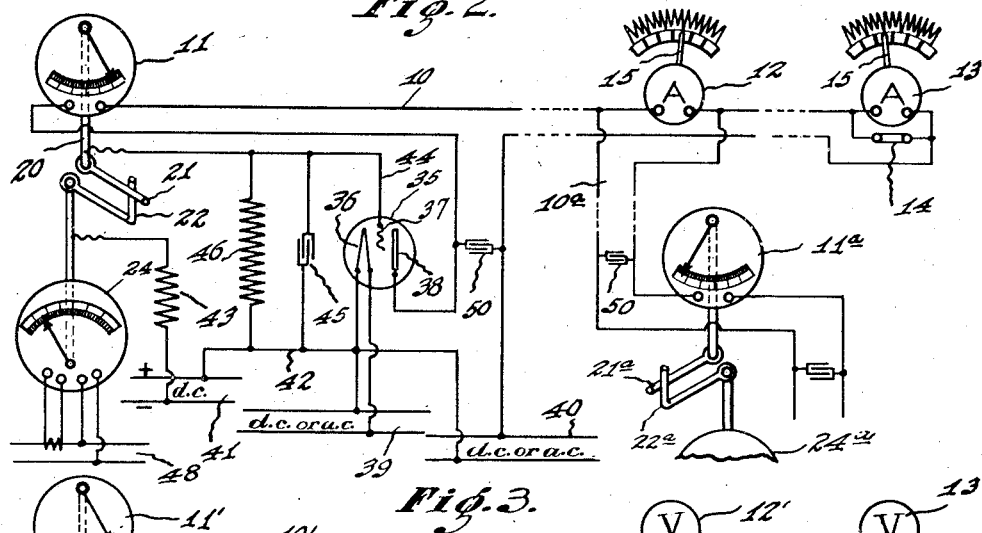
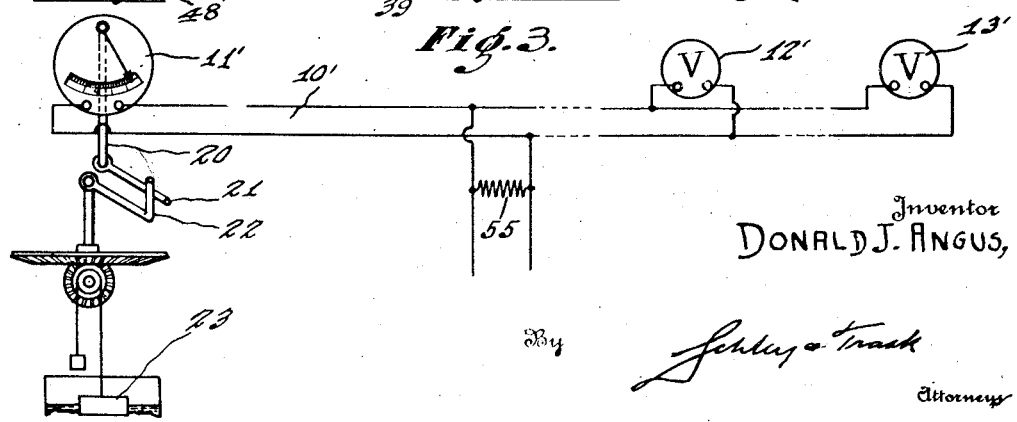
Inventor
DONALD J. ANGUS, Feb. 20, 1934. D. J. ANGUS 1,948,092
METHOD AND APPARATUS FOR PRODUCING GOVERNED MOTION AT A DISTANCE
Filed July 15, 1931 2 Sheets-Sheet 2

Inventor
DONALD J. ANGUS,

Patented Feb. 20, 1934

1,948,092

UNITED STATES PATENT OFFICE 1,948,092

METHOD AND APPARATUS FOR PRODUCING GOVERNED MOTION AT A DISTANCE

Donald J. Angus, Indianapolis, Ind.

Application July 15, 1931. Serial No. 550,857

20 Claims. (Cl. 177—351)

It is the object of my invention to provide a method and a means for automatically placing one or more movable members at a distant point or points in position which at all times corresponds to the position of a movable member at an initial point; and, if desired, in position which at all times bears a desired relation to the positions of a plurality of such movable members at an initial point or points.

It is a further object of my invention to obtain, when desired, this placing of the movable member or members at the distant point or points in a smooth gradient, rather than in a series of spaced steps.

In carrying out my invention, I supply a variable electrical quantity to a meter at an initial point and to a meter at a distant point; govern said variable electrical quantity by a variable field of force, which may be either magnetic or electro-static; and control said variable field of force by relative movement between a primary mover (manual or automatic) and the meter at the initial point. By the term "meter" I mean a movable device which takes a position that is a function of the supplied electrical quantity, and that varies in position as the supplied electrical quantity varies; regardless of whether or not there is any scale or chart on which the value of that electrical quantity is indicated or recorded.

The meters used may be either potential-meters or current-meters; but I prefer the latter. If potential-meters, they are desirably connected in parallel; while if current-meters, they are desirably connected in series.

The variable field of force may be either a magnetic field or an electro-static field; and my invention has many modifications in both of those classes. As an illustration of the first class, I have shown one system in which the magnetic field is the field of an electric generator, which generator supplies the current for the current-meters referred to. As an illustration of the second class, I have shown one system in which the electro-static field is the field of the grid of a three-electrode vacuum tube, which tube has a plate circuit which supplies the current for the current-meters referred to. By the term "three-electrode vacuum tube", I intend to include all tubes in which a current flow between a cathode and an anode is controlled by a grid.

I obtain the control of the field of force by two co-operating contact elements, one of which is operated by the primary mover and the other by the adjacent and relatively movable meter. The electrical connections of these contact elements are such that by the making of contact between them such a change is produced in the field of force that the resultant change in the electrical quantity supplied to the meter tends to produce a movement of the meter at the initial point in the proper direction relative to the primary mover to break such contact.

Figure 5:
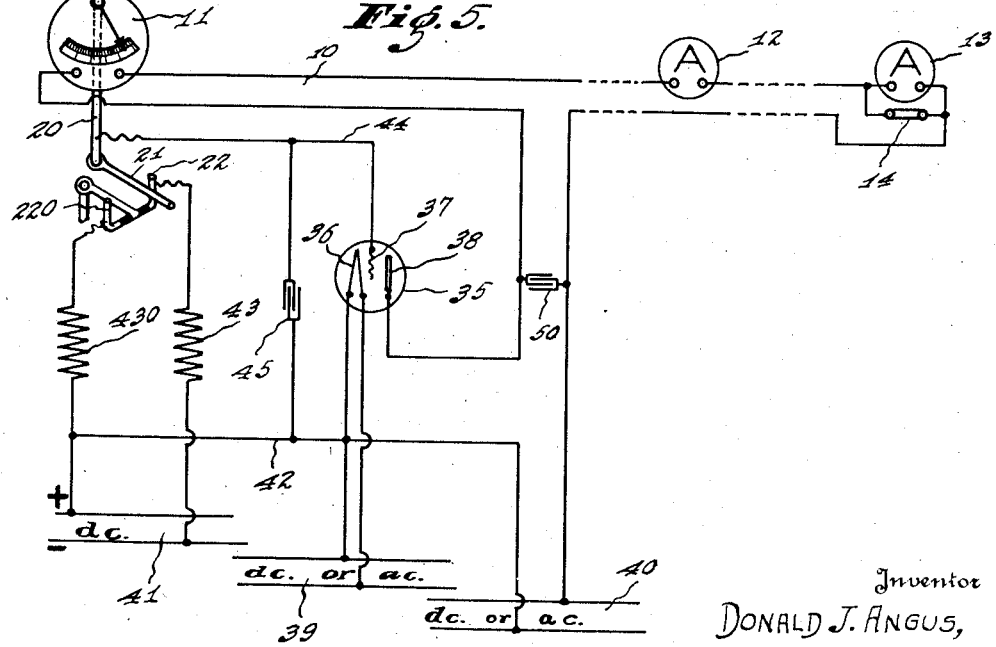

The accompanying drawings show diagrammatically several arrangements embodying my invention. In such drawings, Fig. 1 is a diagram of one form of my invention, in which the field of force is the magnetic field of a generator which supplies current-meters; Fig. 2 is a diagram of another form of my invention, in which the field of force is the electro-static field of the grid of a three-element vacuum tube of which the plate current is the current which actuates current-meters; Fig. 3 is a partial diagram showing the use of potential-meters in place of current-meters; Fig. 4 is a diagram showing a modification of Fig. 2, in which two three-element vacuum tubes are used instead of one, in order to get full-wave rectification when the supply for the plate circuit of the tube is from an A. C. circuit; and Fig. 5 is a diagram showing another modification of Fig. 2, by having a double-contact control instead of the single-contact control of Fig. 2.

I will first describe my invention in connection with current-meters.

In the illustrated forms of my invention using current-meters, (Figs. 1, 2, 4, and 5) a circuit 10 has connected in it in series a current-meter 11 at an initial point and one or more current-meters 12 and 13 at a remote point or points. Any one or more of the current-meters at the remote points may be provided with a short-circuiting switch 14. All of these current-meters may be any type of current-responsive device which has a movable element that takes a position that is a function of the current in the circuit 10, and they may or may not have pointers or marking devices that co-operate with scales or charts. The distant current-meters 12 and 13 may if desired have arms 15 for operating any desired apparatus, rheostats for instance; so that they may make an indication or record and/or operate that apparatus. The current-meter 11 at the initial point is desirably of the d'Arsonval-galvanometer type, in which the movable element takes a position that is a direct function of the supplied current, especially if the current in the circuit 10 is a direct current; but it may also be of other types, especially if the current in the circuit 10 is an alternating current.

In the single-contact forms of my invention, shown in Figs. 1, 2, and 4, the current-meter 11 at the initial point has its movable element on a shaft 20 which carries a contact finger 21. The contact finger 21 is one element of a make-and-break contact device which has another element 22 operated by any suitable primary mover. The co-operation between the contact elements 21 and 22 is controlled by relative movement between the primary mover and the adjacent current-meter 11. Such primary mover may be either manual or automatic; and if automatic may be moved in response to any desired condition, such as the position of a float 23 as shown in Fig. 1, or of the movable element of a watt-meter 24 as shown in Fig. 2. The pair of contact elements 21 and 22, by their interaction, control the variable field of force; which in turn controls the current in the circuit 10.

In the arrangement shown in Fig. 1, the circuit 10 is supplied by the generator 25 of a motor-generator set. The generator 25 may be either D. C. or A. C.; and has a field winding 26 supplied from a D. C. supply-circuit 27, through a resistance 28. The two ends of the resistance 28 are connected to the two contacts 21 and 22; so that the resistance is effective when those two contacts are separated, but is short-circuited and therefore ineffective when those two contacts engage each other. Therefore, the engagement of those two contacts produces a rise in the magnetic field of the generator 25 and therefore a rise in the current in the circuit 10; while a separation of those two contacts produces a fall in such magnetic field, and therefore a fall in the current in the circuit 10.

In the operation of the arrangement shown in Fig. 1, the rise and fall of the float 23, which is the primary mover, causes the contact 22 to be moved, to the right or to the left respectively. For a given position of the float 23, and therefore of the contact 22, the contact 21 repeatedly engages and disengages the contact 22, to maintain a fairly constant but slightly variable magnetic field for the generator 25. Such generator 25 desirably has a relatively slow voltage-response to the making and breaking of engagement between the contacts 21 and 22, either in its inherent design or by the use of external attachments such as condensers and inductances.

When the contact 21 engages the contact 22 to short-circuit the resistance 28, a rise occurs in the magnetic field of the generator 25 and therefore in the current in the circuit 10. Such rise in current tends to produce movements of the movable elements of the current-meters 11, 12, and 13. Such movement of the movable element of the current-meter 11 turns the shaft 20 to move the contact 21 out of engagement with the contact 22. This cuts the resistance 28 again into the field circuit of the generator 25, and produces a decrease in its magnetic field and therefore a decrease in the current it supplies to the circuit 10; which in turn results in a movement of the movable elements of the current-meters 11, 12, and 13 in the reverse direction, so that the contact 21 is brought again into engagement with the contact 22. Then the cycle is repeated, to maintain a slightly variable but nearly constant current in the circuit 10 so long as the float 23 and contact 22 remain unchanged in position. In consequence, the movable elements of the distant current-meters 12 and 13 take positions corresponding to the position of the float 23, or the primary mover, and hold close to that position.

If the float 23 rises or falls, however, it produces a movement of the contact 22 to the right or to the left. If the float rises, the resultant movement to the right causes the contact 22 to carry the contact 21 with it; and the two contacts 21 and 22 remain in engagement until the field strength of the generator 25 has as a result been so increased in strength, and the current in the circuit 10 has been so raised in value, that the movable members of the current-meters 11, 12, and 13 are shifted sufficiently to the right so that the movable member of the current-meter 11 produces disengagement of the contact 21 and the contact 22. Upon such disengagement, a cycle is started and repeated as has already been described, save with the higher current-value necessary to correspond to the changed position of the float 23.

If the float 23 falls, the resultant movement of the contact 22 to the left separates it rather widely from the contact 21, thus cutting in the resistance 28 for a longer time. This results in lowering the magnetic field of the generator 25, and therefore in lowering the current in the circuit 10. As a result the movable members of the current-meters 11, 12, and 13 now move to the left, or to lower-value positions, until the contact 21 catches up with and again engages the contact 22; whereupon a cycle is started and repeated indefinitely in the manner already described, save with all the parts in a position corresponding to the lowered position of the float 23 and the consequent lowered value of the current in the circuit 10.

As the result of all this, the current in the circuit 10, and the positions of the movable members of the current-meters 11, 12, and 13, correspond to the position of the float 23 at all times, and change in position with such float; so that the movable members of the distant current-meters 12 and 13 place themselves in correspondence with the position of such float.

Any of the distant current-meters 12 and 13 may be cut in or out by the short-circuiting switch 14. Such cutting in or out produces a temporary variation in the current in the circuit 10; but that change of current is immediately compensated for by the movement of the current-meter 11 at the initial point, and of its shaft 20, to produce a return of such current to the proper value corresponding to the position of the float 23. This provides a convenient way of testing whether the system is in correct operation.

If desired, the same distant current-meters 12 and 13 may be controlled in response to more than one primary mover, as by a plurality of floats 23 and 23ª as shown in Fig. 1. When more than one primary mover is used in this arrangement, it is desirable that the generators used be D. C. generators; and that the current-meters, of course, be D. C. meters. The mechanism associated with the second float 23ª is like that associated at the initial point with the float 23, and includes a pair of contacts 21ª and 22ª, a resistance 28ª, a field winding 26ª of a generator 25ª, and a circuit 10ª which is supplied by the generator 25ª and includes in it a current-meter 11ª. The circuit 10ª and the circuit 10 are interconnected in shunt so that they supply to the distant current-meters 12 and 13 a current which is the sum (arithmetical or algebraic as the case may be) of the currents from the two generators 25 and 25ᵃ. Each generator 25ᵃ generates a voltage which produces in its circuit 10 or 10ᵃ a current corresponding to the position of the associated float 23 or 23ᵃ, and such current is maintained by the interaction of the contact 22 or 22ᵃ controlled by that float with the contact 21 or 21ᵃ controlled by the adjacent current-meter 11 or 11ᵃ. There may be any number of additional units (float, contacts, generator, and initial-point current-meter), connected in shunt to supply the sum of their currents to the distant current-meter; which distant current-meters thus cause their movable members at all times to bear the desired relation to the position of a plurality of the movable members (floats in this instance) at a plurality of initial points.

In the arrangement shown in Fig. 2, the circuit 10, with the current-meters 11, 12, and 13 therein, is the plate circuit of a three-electrode vacuum tube 35; and the contacts 21 and 22 control the grid potential of that tube, and therethrough control the current in that plate circuit.

The three-electrode vacuum tube 35 has a cathode 36, a grid 37, and an anode or plate 38. The cathode is shown as a hot filament, supplied from a circuit 39, which may be either D. C. or A. C.; but it is not necessary that the hot-filament type of cathode be used. The plate 38 is connected to one side of the circuit 10, and the other side of such circuit 10 is connected to one side of the supply circuit 40, the other side of which is connected to the cathode 36. If the tube 35 is a high-vacuum tube, the supply circuit 40 may be either D. C. or A. C.; but if such tube is a gassy tube, said supply circuit should be A. C.

A D. C. supply circuit 41 supplies potential for the grid 37. The positive side of the supply circuit 41 is connected by a wire 42 to the cathode 36; and the negative side of such supply circuit 41 is connected through a resistance 43 to the contact 22. The contact 21 is connected by a wire 44 to the grid 37. The wires 42 and 44 are interconnected through a condenser 45 and a resistance 46 in parallel. The resistance 46 is desirably a relatively high resistance in comparison to the resistance 43.

In Fig. 2, the contact 22 is shown as being moved by the watt-meter 24, responsive to the watts of a circuit 48.

In the operation of the system shown in Fig. 2, the contacts 21 and 22 are repeatedly moved into and out of engagement as necessary to maintain the potential of the grid 37 such that the plate current which it allows to pass through the tube and therefore through the circuit 10 and the current-meters 11, 12, and 13 is just sufficient to make the movable members of those current-meters take positions corresponding to that of the movable element of the watt-meter 24.

For a given position of the movable member of the watt-meter 24, and therefore of the contact 22, the contact 21 alternately moves into and out of engagement with the contact 22. When the contact 21 engages the contact 22, it causes the grid 37 to become more negative with respect to the cathode 36, by connecting it through the relatively low resistance 43 to the negative side of the circuit 41. This cuts down the current which flows between the cathode 36 and the plate 38 in the tube 35, and thus lowers the current in the circuit 10 and in the current-meters 11, 12, and 13. As a result, the current-meter 11 moves the contact 21 out of engagement with the contact 22. This disconnects the grid 37 from the negative side of the circuit 41, but leaves it connected through the relatively high resistance 46 to the positive side of such circuit 41. In consequence, the potential of the grid 37 becomes less negative with respect to the cathode 36; and this permits more current to pass through the tube 35 between the cathode and the plate, and so causes a rise in the current in the circuit 10. This rise in current causes the current-meter 11 to produce a re-engagement of the contact 21 with the contact 22, to start the cycle anew.

In order to prevent the cycle from being too rapid, and the fluctuations in current too violent, the condenser 45 co-operates with the resistances 43 and 46 to make the action more sluggish.

If the reading of the watt-meter 24 rises or falls, the contact 22 is correspondingly moved to the right or to the left respectively. If by reason of a rise in the watt-meter reading the contact 22 moves to the right, it leaves the contact 21 behind, out of engagement with it; so that for a longer period than usual the two contacts are out of engagement with each other. As a result, the potential of the grid 37 becomes less negative with respect to the cathode 36; and this permits more current to flow between the cathode 36 and the plate 38. In consequence, the current in the circuit 10 is increased, and the movable elements of the current-meters 11, 12, and 13 move to correspond to that increased current. The movement of the movable element of the current-meter 11 carries the contact 21 to the right, or to follow the contact 22 until by reason of such increase of current such contact 21 has engaged the contact 22. Then a new cycle of alternate engagements and disengagements in the contacts starts, in the manner already described, but at a higher current-level for the circuit 10.

On the other hand, if by reason of a fall in the watt-meter reading the contact 22 moves to the left, it carries the contact 21 with it, and in consequence maintains that engagement between the two contacts for a longer time than usual. This results in making the potential of the grid 37 increasingly negative with respect to the cathode 36; which reduces the flow of current between such cathode and the plate 38, and thus reduces the current in the circuit 10. In consequence, the movable elements of the current-meters 11, 12, and 13 tend to take positions to correspond to this progressively reduced current in the circuit 10, and the reduction continues until it results in a movement of the movable element of the current-meter 11 to separate the contact 21 from the contact 22. That starts a new cycle of alternate disengagements and engagements between the contacts 21 and 22, but at a new and lower current-level in the circuit 10.

As the result of all this, the movable members of the current-meters 12 and 13 take positions which correspond very accurately to the position of the movable element of the watt-meter 24.

In a way similar to that already described in connection with the arrangement shown in Fig. 1, one or more duplicate sets of apparatus at one or more other initial points may be provided. Each of these would include a circuit 10ᵃ, a current-meter 11ᵃ therein, a pair of contacts 21ᵃ and 22ᵃ, and mechanism like that already described in connection with the circuit 10 in Fig. 2 for maintaining in the circuit 10ᵃ and in the current-meter 11ᵃ a current which varies in proportion to the position taken by the actuating means for the contact 22ᵃ. The circuit 10ᵃ is connected in shunt to the circuit 10 to supply one or more of the remote current-meters. As shown in Fig. 2, only the current-meter 12 is so supplied by the two circuits 10 and 10$^a$ in parallel. In consequence, in Fig. 2 the distant current-meter 13 takes a position directly corresponding to that of the initial current-meter 11 and of the movable member of the watt-meter 24; but the current-meter 12 takes a position which indicates the sum (arithmetical or algebraic) of the currents in the circuits 10 and 10$^a$, and therefore indicates the sum of the readings of the watt-meters 24 and 24$^a$.

In both Fig. 1 and Fig. 2, it is desirable, but not essential, to have a condenser 50 across each of the circuits 10 and 10$^a$, near either the generator 25 or the tube 35 as the case may be, in order to lessen fluctuations in those circuits and make the currents therein smoother.

In the arrangement shown in Figs. 1 and 2, I have shown preferred arrangements in which the meters 11, 12, and 13 are current-meters, all connected in series in a circuit 10. This use of current-meters in series has a number of advantages, particularly in that it makes the system independent of the resistance of the circuit 10, since it is a constant-current system for any given setting of the control mechanism.

Instead of using current-meters connected in series, however, I may use potential-meters 11', 12', and 13', connected in parallel across a circuit 10' which may be supplied and controlled in the same ways as is the circuit 10 in the arrangements shown in Figs. 1 and 2. This is shown in Fig. 3. In that arrangement, the potential-meter 11' is at the initial point, and operates a shaft 20 which carries the contact 21; the contact 21 cooperates with the contact 22 operated by a primary mover of any sort, such for instance as the float 23 as in Fig. 1. The potential-meters 12' and 13' are the meters at the distant points, and their movable members take positions which correspond to the position of the float 23. The potential-meters 11', 12', and 13' may be of any desired character, including those which operate with some flow of current and those which operate with no flow of current.

When the circuit 10' is supplied through a vacuum tube in a manner similar to that of the circuit 10 of Fig. 2, it is desirable that a resistance 55 be connected across such circuit 10'; because the vacuum tube exerts its control only on flow of current, and the resistance is necessary for that flow of current when the potential-meters 11', 12', and 13' are of a character which requires only potential and no current. The resistance 55 is not necessary when the circuit 10' is supplied from a generator 25 as is the circuit 10 in the arrangement shown in Fig. 1, but it can be present even then.

In the operation of the system shown in Fig. 3, the contacts 21 and 22 are controlled by relative movement between the primary mover, such as the float 23, and the potential-meter 11', to maintain a substantially constant voltage across the circuit 10' for a given position of the primary mover 23, and a voltage which rises and falls as such float rises and falls. This action is obtained by an operation essentially similar to that which has already been discussed in connection with the systems shown in Figs. 1 and 2, save that the control is of voltage rather than of current.

As a result of all this, the meters 12' and 13', like the meters 12 and 13 of the arrangements shown in Figs. 1 and 2, take positions which correspond quite accurately to the position of the float 23 or other primary mover.

In the arrangement shown in Fig. 2, if the supply circuit 40 is an A. C. circuit, there is only half-wave rectification because there is only a single tube 35, and that tube permits only unidirectional flow of current through the circuit 10. If it is desired to get full-wave rectification, the modification shown in Fig. 4 may be used. Here the circuit 40 is an A. C. circuit, and is connected to the circuit 10 through a transformer 60 and two three-element vacuum tubes 35. One side of the circuit 10 is connected to an intermediate point in the secondary of the transformer 60. The other side of the circuit 10 is connected to the two cathodes 36 of the two tubes 35. The two ends of the secondary of the transformer 60 are connected respectively to the two plates (or anodes) of the two tubes 35. The two cathodes 36 of the two tubes 35 are shown as hot-filament cathodes, supplied in parallel from the circuit 39, D. C. or A. C., as the single hot-filament cathode is supplied in Fig. 2. The two grids 37 of the two tubes 35 are connected together and to the wire 44. The other elements of the system are the same as in Fig. 2. The operation of the system shown in Fig. 4 is the same as that which has been described in connection with Fig. 2, save that the circuit 10 receives current unidirectionally from both sets of half-waves of the supply-circuit 40 instead of from only one set of such half-waves as it does in Fig. 2 when the supply circuit 40 is an A. C. circuit.

In the system so far described, as shown in Figs. 1 to 4 inclusive, a single-contact control is used, involving merely the making and breaking of contact between the single pair of contact fingers 21 and 22. But my invention is not limited to the mere making and breaking of one contact with a single other contact. Instead, the contact element operated by one of the two co-operating control members (the primary mover and the meter at the initial point) may have a pair of contacts between which is located a single contact finger which forms the co-operating contact element carried by the other of said two controlling members; and the control in opposite directions may be obtained by the engagement of the contact finger of the second contact element with the respective contact fingers of the first contact element.

This is illustrated in Fig. 5; which may be considered a modification of Fig. 2, with the double-contact control.

In the arrangement shown in Fig. 5, the contact finger 21 which is operated by the current-meter 11 at the initial point is located between a contact finger 22 (which corresponds to the contact 22 of Fig. 2) and a second contact finger 220. The two contact fingers 22 and 220 form the second contact element, the relative movement between which and the first contact element 21 exerts the control. This second contact element, consisting of the two fingers 22 and 220, which are of course insulated from each other, is operated by the primary mover, such as the float 23 or watt-meter 24 shown in other figures. The contact finger 22, as in Fig. 2, is connected through a resistance 43 to the negative side of the D. C. supply circuit 41; while the contact finger 220 is connected through a resistance 430 to the positive side of that supply circuit. As in Fig. 2, the positive side of the supply circuit 41 is also connected by a wire 42 to the cathode 36 of the tube 35. Because of the provision of the additional contact 220 which is connected through the resistances 430 to the positive side of the circuit 41, the resistance 46 of Fig. 2 is omitted in Fig. 5 With these exceptions, the connections in the arrangement shown in Fig. 5 are the same as those shown in Fig. 2.

The operation of the system shown in Fig. 5 is generically like that of the system shown in Fig. 2, in that the control exerted by relative movement between the prime mover and the current-meter 11 at the initial point, and therefore between the contact elements respectively carried by those two relatively movable control elements, maintains a substantially constant current in the circuit 10 for any given position of the primary mover, and causes that current to increase or decrease as the position of the primary mover changes. Instead of merely making and breaking the circuit, as in the systems shown in Figs. 1 to 4 inclusive, relative movement between the first contact element 21 and the second contact element having the two contact fingers 22 and 220 may produce engagement of the contact finger 21 with either (but never both simultaneously) of the contact fingers 22 and 220, to connect the grid 37 through the resistances 43 and 430 to the negative and positive sides respectively of the circuit 41. In one instance, the grid is caused to become less negative, in the other to become more negative in respect to cathode 36; to permit more or less current respectively to pass through the tube 35 and the circuit 10. By reason of these two actions, whenever the contact 21 engages either contact 22 or 220 it initiates a series of control actions which cause it to be moved out of engagement with the contact which it has engaged; and this causes the current in the circuit 10 to be maintained at such value that the movable elements of the current-meters 11, 12, and 13 correspond to the position of the primary mover.

If the primary mover changes in position, as by the rise or fall of the float or change in position of the movable element of the watt-meter, one or the other of the contact fingers 22 and 220 engages the contact finger 21; and this engagement of the contact 21 with either of the other contacts causes the necessary controlling action so to change the potential of the grid 37 with respect to that of the cathode 36 that a new current value is established in the circuit 10 sufficient to cause the movable element of the current-meter 11 to move the contact 21 out of engagement with the contact 22 or 220 by which it was thus engaged upon the change in position of the primary mover. This change in the current in the circuit 10 to produce this result also produces a change in the position of the movable elements of the distant current-meters 12 and 13 to correspond to the new position taken by the primary mover.

I claim as my invention:

1. The method of producing governed motion at a distant point, which comprises supplying a variable direct-current electrical quantity to a meter at an initial point and to a meter at the distant point, governing in common by a gradually variable electrostatic field the variable electrical quantity supplied to both meters, and controlling said gradually variable electrostatic field by relative movement between a primary mover and the meter at the initial point.

2. The method of producing governed motion at a distant point, which comprises supplying direct current to a current-meter at an initial point and to a current-meter at the distant point, governing in common by a gradually variable electrostatic field the current in both current-meters, and controlling said gradually variable electrostatic field by relative movement between a primary mover and the current-meter at the initial point.

3. The method of producing governed motion at a distant point, which comprises supplying direct current in series to a current-meter at an initial point and to a current-meter at a distant point, governing the current in both current-meters by a gradually variable electrostatic field, and controlling said gradually variable electrostatic field by relative movement between a primary mover and the current-meter at the initial point.

4. The method of producing governed motion at a distant point, which comprises supplying a variable direct-current electrical quantity to a meter at an initial point and to a meter at the distant point, governing in common by a gradually variable electrostatic field the variable electrical quantity supplied to both meters, and controlling said gradually variable electrostatic field by a make-and-break contact mechanism having a contact element operated by a primary mover and a co-operating contact element operated by the meter at the initial point.

5. The method of producing governed motion at a distant point, which comprises supplying direct current to a current-meter at an initial point and to a current-meter at the distant point, governing in common by a gradually variable electrostatic field the current in both current-meters, and controlling said gradually variable electrostatic field by a make-and-break contact mechanism having a contact element operated by a primary mover and a co-operating contact element operated by the current-meter at the initial point.

6. The method of producing governed motion at a distant point, which comprises supplying direct current in series to a current-meter at an initial point and to a current-meter at the distant point, governing the current in both current-meters by a gradually variable electrostatic field, and controlling said gradually variable electrostatic field by a make-and-break contact mechanism having a contact element operated by a primary mover and a co-operating contact element operated by the current-meter at the initial point.

7. A system for producing governed motion at a distant point, comprising a meter at an initial point, a meter at the distant point, means for supplying a variable direct-current electrical quantity to each of said meters, means for producing a gradually variable electrostatic field which governs in common the variable electrical quantity supplied to both meters, and means for controlling said gradually variable electrostatic field by relative movement between a primary mover and the meter at the initial point.

8. A system for producing governed motion at a distant point, comprising a direct-current current-meter at an initial point, a direct-current current-meter at the distant point, means for supplying direct current to each of said meters, means for producing a gradually variable electrostatic field which governs in common the current supplied to both meters, and means for controlling said gradually variable electrostatic field by relative movement between a primary mover and the meter at the initial point.

9. A system for producing governed motion at a distant point, comprising a direct-current current-meter at an initial point, a direct-current current-meter at the distant point, means for supplying direct current to said two meters in series, means for producing a gradually variable electrostatic field which governs the current supplied to said two current-meters, and means for controlling said gradually variable electrostatic field by relative movement between a primary mover and the meter at the initial point.

10. A system for producing governed motion at a distant point, comprising a meter at an initial point, a meter at the distant point, means for supplying a variable direct-current electrical quantity to each of said meters, means for producing a gradually variable electrostatic field which governs in common the variable electrical quantity supplied to both meters, a primary mover, and a make-and-break contact mechanism, controlling said gradually variable electrostatic field and having a contact element operated by said primary mover and a co-operating contact element operated by the meter at the initial point.

11. A system for producing governed motion at a distant point, comprising a direct-current current-meter at an initial point, a direct-current current-meter at the distant point, means for supplying direct current to each of said meters, means for producing a gradually variable electrostatic field which governs in common the current supplied to both meters, a primary mover, and a make-and-break contact mechanism controlling said gradually variable electrostatic field and having a contact element operated by said primary mover and a co-operating contact element operated by the current-meter at the initial point.

12. A system for producing governed motion at a distant point, comprising a direct-current current-meter at an initial point, a direct-current current-meter at the distant point, means for supplying direct current to said two meters in series, means for producing a gradually variable electrostatic field which governs the current supplied to said two current-meters, a primary mover, and a make-and-break contact mechanism controlling said gradually variable electrostatic field and having a contact element operated by said primary mover and a co-operating contact element operated by the current-meter at the initial point.

13. The method of producing governed motion at a distant point, which comprises supplying a variable direct-current electrical quantity to a meter at an initial point and to a meter at the distant point, thermionically governing in common the variable electrical quantity supplied to both meters, and controlling the thermionic governing action by varying the potential at an intermediate point in the free ion path by relative movement between a primary mover and the meter at the initial point.

14. The method of producing governed motion at a distant point, which comprises supplying direct current in series to a direct-current current-meter at an initial point and to a direct-current current-meter at the distant point, thermionically governing the current supplied to both current-meters, and controlling the thermionic governing action by varying the potential at an intermediate point in the free ion path by relative movement between a primary mover and the current-meter at the initial point.

15. The method of producing governed motion at a distant point, which comprises supplying direct current in series to a direct-current current-meter at an initial point and to a direct-current current-meter at the distant point, thermionically governing the current supplied to both current-meters; and controlling the thermionic governing action by varying the potential at an intermediate point in the free ion path by a make-and-break contact mechanism having a contact element operated by a primary mover and a co-operating contact element operated by the meter at the initial point.

16. A system for producing governed motion at a distant point, comprising a direct-current meter at an initial point, a direct-current meter at the distant point, means for supplying a variable direct-current electrical quantity to each of said meters, a three-element vacuum tube which governs said variable electrical quantity, and means for controlling the grid potential of said three-element vacuum tube by relative movement between a primary mover and the meter at the initial point.

17. A system for producing governed motion at a distant point, comprising a direct-current current-meter at an initial point, a direct-current current-meter at the distant point, means for supplying direct current in series to said two current-meters, a three-element vacuum tube which governs the current supplied to said two current-meters, and means for controlling the grid potential of said three-element vacuum tube by relative movement between a primary mover and the current-meter at the initial point.

18. A system for producing governed motion at a distant point, comprising a direct-current current-meter at an initial point, a direct-current current-meter at the distant point, means for supplying direct current in series to said two current-meters, a three-element vacuum tube which governs the current supplied to said two current-meters, and a make-and-break contact mechanism controlling the grid potential of said three-element vacuum tube, said make-and-break contact mechanism having a contact element operable by a primary mover and a co-operating contact element operated by the current-meter at the initial point.

19. A system for producing governed motion at a distant point as set forth in claim 18, in which each of the contact elements of the make-and-break contact mechanism consists of a single finger which co-operates with the single finger of the other contact element.

20. A system for producing governed motion at a distant point as set forth in claim 18, in which one of the contact elements comprises two contact fingers insulated from each other and the other contact element comprises a contact finger which lies between the two contact fingers of the first contact element and may co-operate with either of them.

DONALD J. ANGUS.